(No Model.) 2 Sheets—Sheet 1.

L. C. E. MEYER.
APPARATUS FOR STOPPING ENGINES.

No. 533,309. Patented Jan. 29, 1895.

WITNESSES

L. M. Hachschlager,
Fred. E. Morse

INVENTOR
Lucien C. E. Meyer,
BY Briesen & Knauth
ATTORNEYS.

(No Model.) 2 Sheets—Sheet 2.
L. C. E. MEYER.
APPARATUS FOR STOPPING ENGINES.
No. 533,309. Patented Jan. 29, 1895.
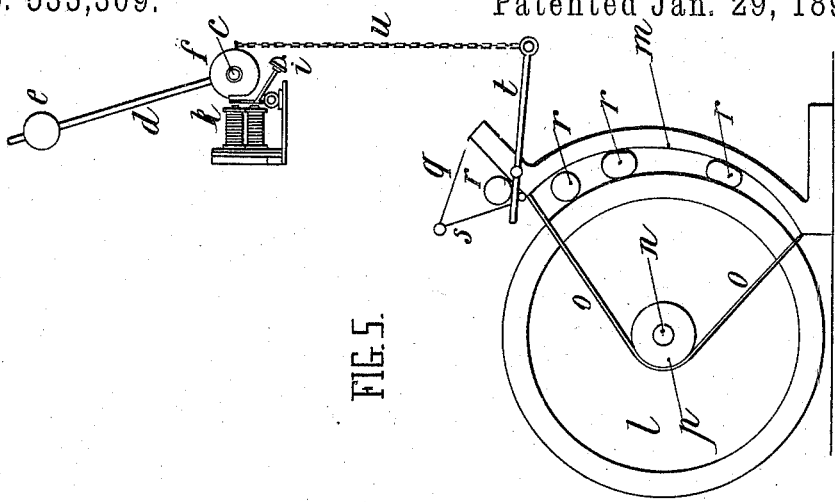
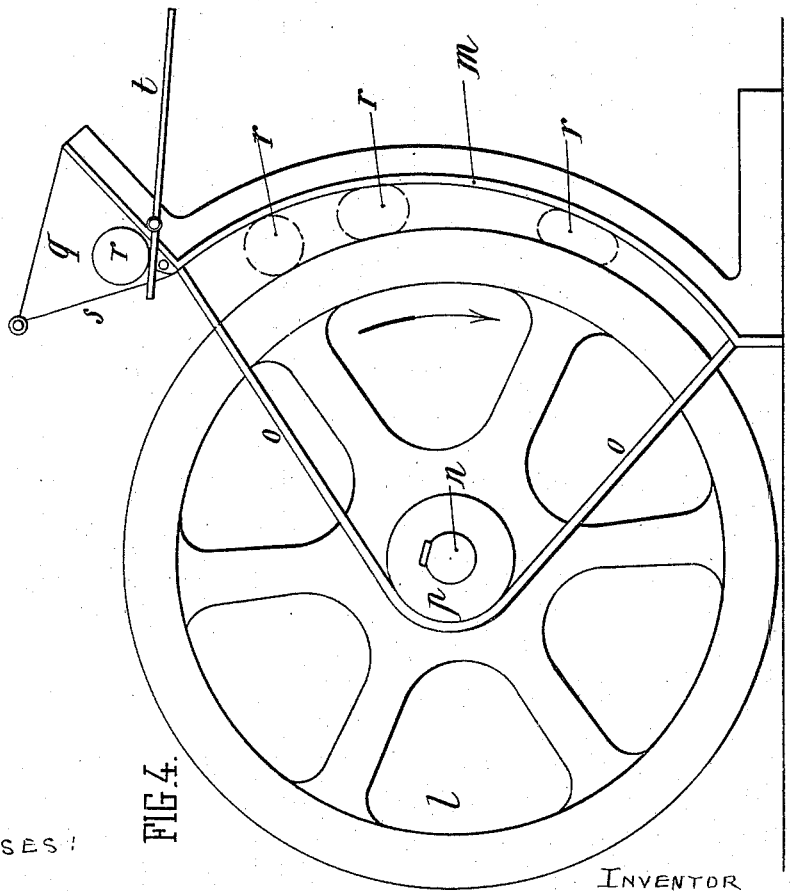
WITNESSES:
INVENTOR
Lucien C. E. Meyer,
BY
ATTORNEYS.

UNITED STATES PATENT OFFICE.

LUCIEN CHARLES ERNEST MEYER, OF PARIS, FRANCE.

APPARATUS FOR STOPPING ENGINES.

SPECIFICATION forming part of Letters Patent No. 533,309, dated January 29, 1895.

Application filed August 22, 1894. Serial No. 520,956. (No model.) Patented in France January 27, 1894, No. 235,855.

*To all whom it may concern:*

Be it known that I, LUCIEN CHARLES ERNEST MEYER, of the city of Paris, France, have invented Improved Apparatus for Stopping Engines, (for which I have obtained Letters Patent in France for fifteen years, dated January 27, 1894, No. 235,855,) of which the following is a full, clear, and exact description.

This invention has for its object to enable steam or other engines to be instantly stopped from any part of a workshop in case of emergency, as for example when a workman happens to be caught in a machine.

The apparatus consists essentially of a peculiar kind of brake, operating by the compression of a ball of india rubber or equivalent material, in combination with a stop valve which when operated by an electric current brings the brake into action and shuts off the supply of motive fluid to the engine.

The invention will be described with reference to the accompanying drawings forming part of this specification, wherein—

Figure 1:
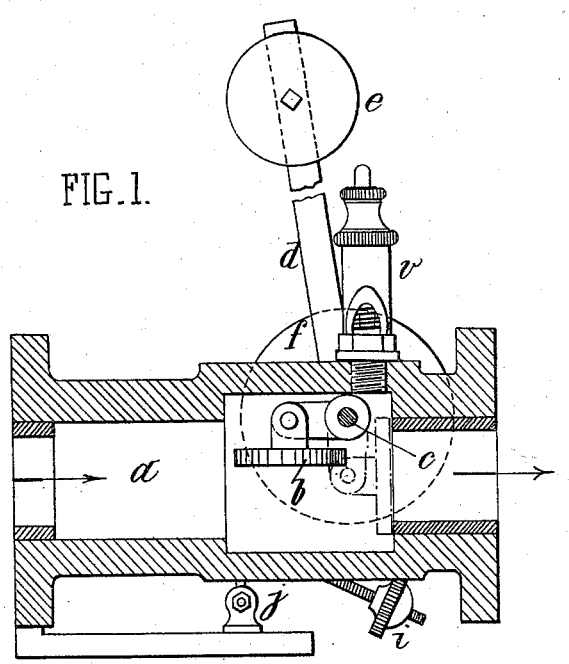
Figure 3:
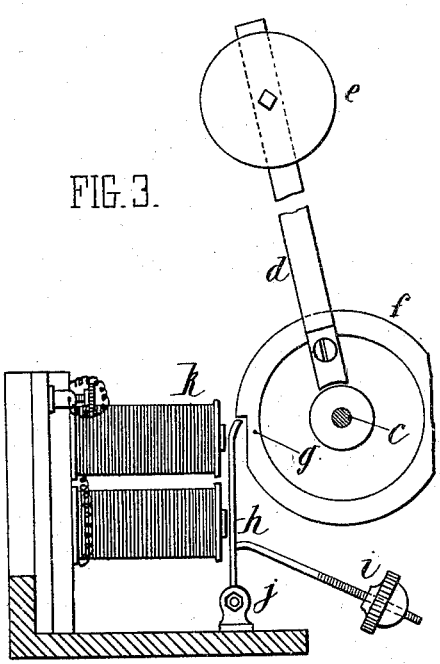
Figure 2:
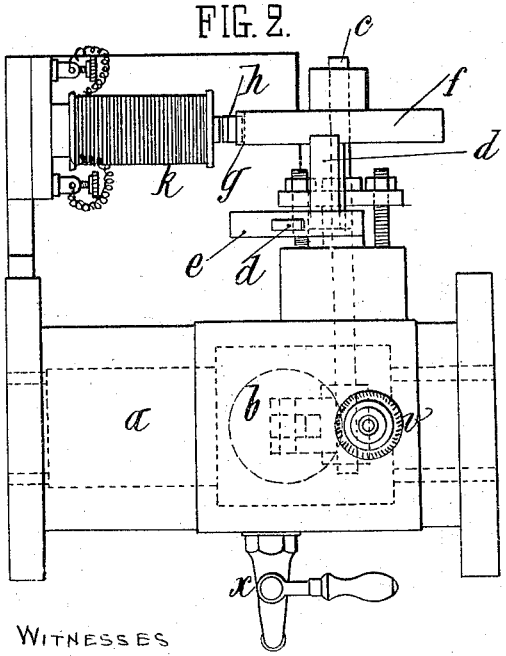

Figure 1 is a longitudinal section, Fig. 2 a plan and Fig. 3 an end view of the stop valve. Fig. 4 is an elevation of the friction brake which forms part of the stopping mechanism. Fig. 5 shows the general arrangement of the combined stop valve and brake.

The stop valve $b$ is mounted on a shaft $c$ within a chamber $a$ provided with a safety valve $v$. The shaft $c$ passes out through one side of the valve chamber and upon its outer end is fixed a lever arm $d$ carrying a counter weight $e$ which is held normally in the raised position shown by the engagement of a detent $h$ with a notch $g$ in the periphery of the disk-shaped boss $f$, of the weighted lever, the notch being so situated with regard to the valve that when engaged by the detent the valve $b$ is wide open and the weight is raised and ready to fall in order to close the valve.

The detent $h$ is pivoted at $j$ and is thrown into engagement with the notch by a weighted arm $i$ and this detent forms the armature of an electro-magnet $k$ so that if the circuit be closed by a push piece or switch at any point in the workshop the attraction of the armature $h$ will disengage the detent from the notch and allow the weighted arm $d\ e$ to fall and close the valve, thus shutting off the steam or other motive fluid from the engine which, however, would not be instantly stopped, by reason of the energy stored up in its moving parts. To insure the immediate stoppage, the valve closing device is combined with and caused to act upon a special form of brake in such manner that the brake is brought into action immediately after the valve has been closed. This brake, which acts upon the fly wheel $l$ or on the main shaft, consists of a roller path $m$ partially encircling the periphery of the fly wheel or another wheel keyed on the main shaft $n$, the roller path being held at a short distance from and eccentric to the periphery of the wheel. The rods $o$ pass round the hub $p$ of the wheel without gripping it so that there is no friction at this point during normal working. At the upper part of the roller path which is most distant from the periphery of the wheel is a hopper $g$ containing a number of cylinders or rollers $r$ of caoutchouc or other material and the side $s$ of the hopper is hinged so that it may open to let the rollers pass from the hopper into the space between the wheel and the eccentric roller path where the rollers carried down in the gradually narrowing space by the motion of the wheel become more and more compressed or jammed.

The opening of the hopper flap $s$ is effected by a latch lever $t$ connected by a cord or chain $u$ to the boss $f$ of the valve operating lever $d$ so that when the latter falls to close the valve the latch lever $t$ is disengaged from the hopper flap which opens and allows the brake rollers to come into action to stop the engine.

The tie rods $o$ serve to prevent any undue strain on the shaft bearings when the brake comes into action however sudden may be its operation.

It is to be understood that I do not limit myself to the use of electrical means of actuating the detent $h$ as this may be effected pneumatically by a piston actuated from a distance by the compression of a bulb upon an air pipe connected therewith. The flap valve $b$ may also be replaced by another form of valve which also admits of the passage of the fluid being regulated by it, and the forms, details, materials and dimensions of the other parts may be variously modified without departing from the principle of the invention.

I claim—

1. In an engine stop motion as herein specified, the combination of a stop-valve, a brake consisting in the combination with the fly-wheel, of the roller path $m$ eccentric thereto and of rollers of yielding material acting by compression in the gradually contracting space between the roller path and the fly-wheel, an electro-magnetic mechanism for closing the stop-valve and discharging the roller into the roller path, substantially as specified.

2. In an engine stop-motion, the combination of a stop-valve for controlling the fluid supply to the engine, a weighted lever $d$ connected directly to the stop-valve and serving when released to close the same, detent mechanism for holding the weighted lever in position to maintain the stop-valve open, electro-magnetic releasing mechanism for moving the detent to release the weighted lever, and a brake for the engine operated by the closing of the stop-valve substantially as described.

The foregoing specification of my improved apparatus for stopping engines signed by me this 3d day of August, 1894.

LUCIEN CHARLES ERNEST MEYER.

Witnesses:
CLYDE SHROPSHIRE,
ALBERT MOREAU.